United States Patent
Brandt et al.

(10) Patent No.: US 9,540,084 B2
(45) Date of Patent: Jan. 10, 2017

(54) SUBMARINE

(75) Inventors: Hendrik Brandt, Schönkirchen (DE); Jens Fischer, Kiel (DE)

(73) Assignee: ThyssenKrupp Marine Systems GmbH, Kiel (DE)

( * ) Notice: Subject to any disclaimer, the term of this patent is extended or adjusted under 35 U.S.C. 154(b) by 56 days.

(21) Appl. No.: 14/124,327

(22) PCT Filed: Jun. 6, 2012

(86) PCT No.: PCT/EP2012/060761
§ 371 (c)(1),
(2), (4) Date: Dec. 6, 2013

(87) PCT Pub. No.: WO2012/168334
PCT Pub. Date: Dec. 13, 2012

(65) Prior Publication Data
US 2014/0116318 A1  May 1, 2014

(30) Foreign Application Priority Data
Jun. 7, 2011  (DE) .......................... 10 2011 104 122

(51) Int. Cl.
*E02B 15/04* (2006.01)
*B63G 8/00* (2006.01)
*B63B 35/32* (2006.01)

(52) U.S. Cl.
CPC ............... *B63G 8/001* (2013.01); *B63B 35/32* (2013.01); *E02B 15/046* (2013.01)

(58) Field of Classification Search
CPC ...... E02B 15/046; E02B 15/047; B63B 35/44; B63B 2702/12; B63G 8/00; B63G 8/001
USPC ...... 114/312, 313, 321, 322, 336; 210/747.6
See application file for complete search history.

(56) References Cited

U.S. PATENT DOCUMENTS

| | | | | |
|---|---|---|---|---|
| 3,561,387 A * | 2/1971 | Kumm | ..................... | B63B 27/36 114/322 |
| 3,561,601 A * | 2/1971 | McNeely | ..................... | 210/242.1 |
| 5,022,987 A | 6/1991 | Wells | | |
| 5,169,526 A * | 12/1992 | Gould | ..................... | 210/242.3 |
| 6,269,763 B1 * | 8/2001 | Woodland | ..................... | 114/382 |
| 6,834,608 B1 * | 12/2004 | Ansay et al. | ..................... | 114/312 |
| 2008/0135494 A1 * | 6/2008 | Usher | ..................... | 210/747 |

* cited by examiner

*Primary Examiner* — Andrew Polay
(74) *Attorney, Agent, or Firm* — McGlew and Tuttle, P.C.

(57) ABSTRACT

A submarine is designed for combating oil when submerged. The submarine includes a snout (14, 36) which is conduit-connected to a conduit leading into the submarine. The snout (14, 36) is part of an oil suction device and/or part of a device for bringing out an oil decomposition substance. The snout (14) may be designed in a rigid manner and be pivotable from a position between a pressure hull (6) of the submarine and an outer hull (10) forming an upper deck (12) of the submarine, into a position outside the outer hull (10). The snout (36) may also be designed in a flexible manner, wherein the snout (36) is fastened in a section adjacent to a free end, on an ROV (40).

12 Claims, 5 Drawing Sheets

SUBMARINE

CROSS REFERENCE TO RELATED APPLICATIONS

This application is a United States National Phase Application of International Application PCT/EP2012/060761 filed Jun. 6, 2012 and claims the benefit of priority under 35 U.S.C. §119 of German Patent Application DE 10 2011 104 122.6 filed Jun. 7, 2011, the entire contents of which are incorporated herein by reference.

FIELD OF THE INVENTION

The invention relates to a submarine.

BACKGROUND OF THE INVENTION

Offshore oil production in the Arctic has become economical due to the increased oil demand and the reduction of other reserves. If however oil spills occur during the production, combating the oil spillage has been found to be particularly problematic if the oil collects below the surface of the ice and is thus not directly accessible. Ice layers up to a certain thickness can be broken with ice breakers and the oil located therebelow can be combated by way of scooping up, flaring off or by way of the addition of oil decomposition products. The application of ice breakers however is no longer possible with ice layers of a greater thickness.

SUMMARY OF THE INVENTION

Against this background, it is the object of the invention to create the possibility of being able to combat oil located below the ice layer, even with such ice layers which can no longer be broken up by icebreakers.

According to the invention, a submarine is designed for combating oil when submerged. The submarine includes a snout which is conduit-connected to a conduit leading into the submarine. The snout is part of an oil suction device and/or part of a device for bringing out an oil decomposition substance. The snout may be designed in a rigid manner and be pivotable from a position between a pressure hull of the submarine and an outer hull forming an upper deck of the submarine, into a position outside the outer hull. The snout may also be designed in a flexible manner, wherein the snout is fastened in a section adjacent to a free end, on an ROV.

The basic idea of the invention is to combat oil which with oil production in the Arctic collects in an oil bubble below a sheet of ice after spills, from below the sheet of ice by way of submarine submerged to the oil bubble. I.e. according to the invention, a submarine is provided, which is designed for combating oil at submerged travel or whilst submerged. Accordingly, it is no longer necessary to break open the ice sheet located over the oil, in order to have access to the oil, before combating the oil.

With regard to the submarine according to the invention, it is the case of a manned submarine which can be designed for comparatively shallow submerged depths, since it is applied in a region which is directly adjacent the surface of the water. Usefully, the submarine comprises a drive which is independent of external air, for example a fuel cell drive, since the submarine, as the case may be, must spend a longer time below a closed ice layer. The submarine is equipped with means for receiving the oil located below the surface of the ice and/or with means for bringing out oil decomposition means such as chemical dispersants or means for accelerating bioremediation, and/or oil binding agents, for combating the oil.

The submarine according to the invention preferably comprises an oil suction device. The submarine further preferably comprises a snout (nozzle or trunk) as part of the oil suction device, in order to be able to suck away the oil at a position adequately distanced to the ice layer and thus prevent collision of the submarine with the ice layer. This snout can be fastened in a rigid or movable manner on the submarine on the outer side of a pressure hull of the submarine in the region of an upper deck, wherein it is aligned perpendicularly or preferably obliquely in the direction of the water surface. A snout which when not in use is arranged for example in the space between the pressure hull and the outer hull, in particular in the region of the upper deck and is movable out of this space into its operating position for sucking away oil is however preferred. A suction head in the form of a suction nozzle or a suction cup can be formed at the free end of the snout. On the part of the submarine, the snout is usefully connected to an oil suction pump, with which the oil is pumped into the submarine or into a tank located outside the submarine.

The snout can be designed in a rigid manner which is simple with regard to design, and be pivotable from a position between the pressure hull of the submarine and an outer hull forming the upper deck of the submarine, into a position outside the outer hull. A rigid pipe then forms the snout in this case. This pipe or tube as the case may be, can be designed in a telescopic manner. A pivot mechanism is arranged on the outside of the pressure hull of the submarine. The snout is connected to this pivot mechanism. The snout is pivoted with the pivot mechanism such that its end which is away from the submarine reaches into the oil bubble. The submarine usefully dynamically retains its position below the oil bubble during the sucking of the oil. For this, the submarine according to the invention can advantageously be equipped with an auxiliary drive, for example with an inline thruster.

In an advantageous, alternative design, the snout can be designed in a flexible manner, wherein the snout is fastened in a section adjacent to its free end, on an ROV (remotely operated vehicle), i.e. onto a remotely controlled, in particular cable-led underwater vehicle. Accordingly, the snout can be a hose which is to say a flexible tube, which for sucking oil is wound off from a motorically actuated hose drum which is arranged in the intermediate space between the pressure hull of the submarine and the upper deck, wherein the free hose end with the suction nozzle or suction cup fastened thereto, is moved to the oil bubble in a remote-controlled manner by the ROV, on which the hose is fastened. The use of a flexible snout has the advantage that no rigid connection exists between the suction head and the submarine. Contacts of the suction head or of the snout with the lower side of the ice do not endanger the submarine or the snout. Moreover, movements of the submarine no longer have an effect on the positioning of the suction head, since the positioning of the snout and thus of the suction head is assumed by the ROV. A particularly efficient sucking-away of oil is possible by way of this.

Further advantageously, a submarine which comprises an oil suction device with a flexible snout which can be moved by an ROV can also be used to suck away fuel out of sunken ships. In this case, the submarine positions itself in the proximity of the sunken ship, but at a distance to this ship. The snout is then moved by the ROV up to the ship such that a suction cup formed on the snout comes to bear on a ship's side which delimits the fuel bunker. After an opening has been previously created on the ship's side, the fuel is pumped with the oil suction device of the submarine according to the invention out of the fuel bunker into the submarine or into a tank located outside the submarine.

The localization of an oil accumulation located below the ice surface can be effected by way of coordinates determined above water, which are then transferred to the submarine. The submarine according to the invention, however particularly preferably, has its own oil locating device. Hereby, it is preferably the case of a sonar system, with which oil can be detected.

As a rule, not only oil, but a seawater/oil mixture, can be sucked with the oil suction device of the submarine according to the invention. For this reason, the submarine usefully comprises an oil/water separating device. The water separated from the oil in this separating procedure is pumped away via a lock formed on the submarine, out of the submarine to the outboard.

The submarine according to the invention advantageously comprises at least one oil tank for storing the sucked-away oil. Here, it can be the case of an oil tank which is fixedly installed in the submarine and whose holding volume corresponds to the holding capacity of conventional surface oil-combating vessels. The oil is preferably pumped into the oil tank by way of a pump arranged on the exit side of the oil outlet of the oil/water separating device. As soon as the oil tank is completely filled, the submarine travels into the next ice-free port or harbour or into an ice-free zone, where a surface tanker waits for the submarine. There, the submarine transfers the oil and, as the case may be, receives fuel and provisions, in order to subsequently return back to its deployment location.

Instead of an oil tank installed in a fixed manner, the submarine according to the invention can particularly advantageously comprise several oil tanks which can be brought out of the submarine. With regard to these oil tanks, it is preferably the case of flexible tanks which without filling only assume a small storage volume in the submarine, but whose inner volume significantly increases on filling due to the flexibility of the oil tank. The filling of this flexible tank is usefully effected outside the submarine. Accordingly, the submarine preferably comprises a lock for bringing the oil tank out of the submarine.

Further advantageously, the submarine according to the invention comprises a filling device for filling the flexible oil tank. This filling device is preferably arranged at the oil exit of the oil/water separating device. The filling device preferably comprises a pump, an intermediate storage device and a filling nozzle which within the submarine can be connected to a flexible oil tank. The filling nozzle is preferably arranged within the lock for bringing out the flexible oil tank. After closure of the oil tank at the filling nozzle, the oil tank is brought to the outside of the submarine via the lock by way of flooding this and a subsequent automatic opening of an outer hatch cover of the lock, and is filled here outside the submarine. Moreover, the filling device comprises means with which the filling nozzle can be separated from within the submarine, from the flexible tank after its filling. In order to prevent the oil from running out of the oil tank after separation of the filling nozzle from the oil tank, the oil inlet of the oil tank is usefully provided with a check valve. This check valve is preferably arranged in a solid hose piece of the oil tank which connects the oil tank and the filling nozzle.

After the separation of the filling nozzle from the oil tank, the oil tanks due to buoyancy rise to directly below the ice layer, where at a later point in time, they can be received by a further submarine as the case may be, or, when the ice has disappeared, by a surface vessel, and can be transported to a harbour or to a surface vessel. The filling device can advantageously comprise means, with which a gas can be brought into the oil tanks, for the improvement of the buoyancy characteristics of the flexible oil tank.

Usefully, the submarine according to the invention comprises a storage space, in which the not yet filled, flexible oil tanks are stored. Advantageously, a transport device can be provided in the submarine, for the transport of the oil tank from the storage space to the filling device. This transport device is preferably designed in a manner such that it automatically receives an oil tank in the storage space and transports it to the filling device in front of its filling nozzle and, after fastening the filling nozzle on the oil tank, is transported to the lock for bringing out the oil tank.

Apart from sucking away oil, the snout of the suction device of the submarine according to the invention can also serve for bringing chemical and/or biological oil decomposition agents to an oil bubble located below an ice sheet. For this, the snout is preferably connectable onto a pump for bringing out oil decomposition means. The oil decomposition means are delivered or conveyed from the submarine to the oil bubble via the snout, by way of this pump.

The invention is hereinafter explained in more detail by way of embodiment examples represented in the drawing. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
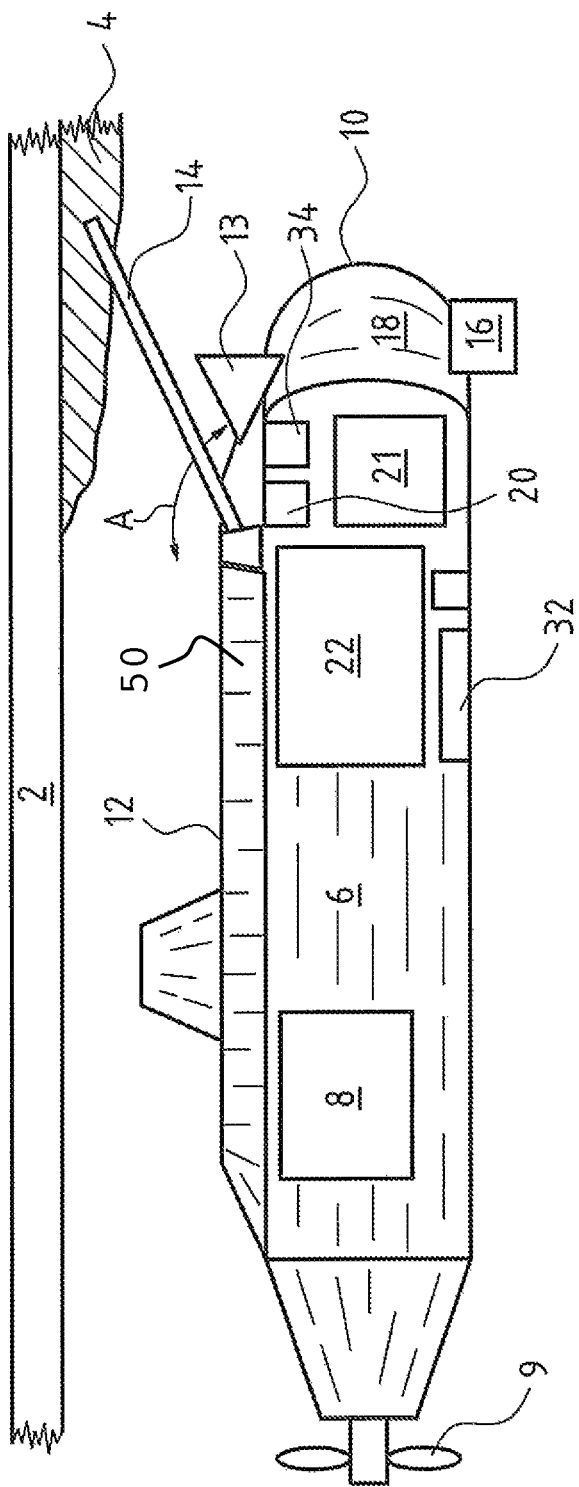
FIG. 1 is a schematic greatly simplified view showing a submarine designed for combating oil, in a first embodiment and on deployment.
Figure 2:
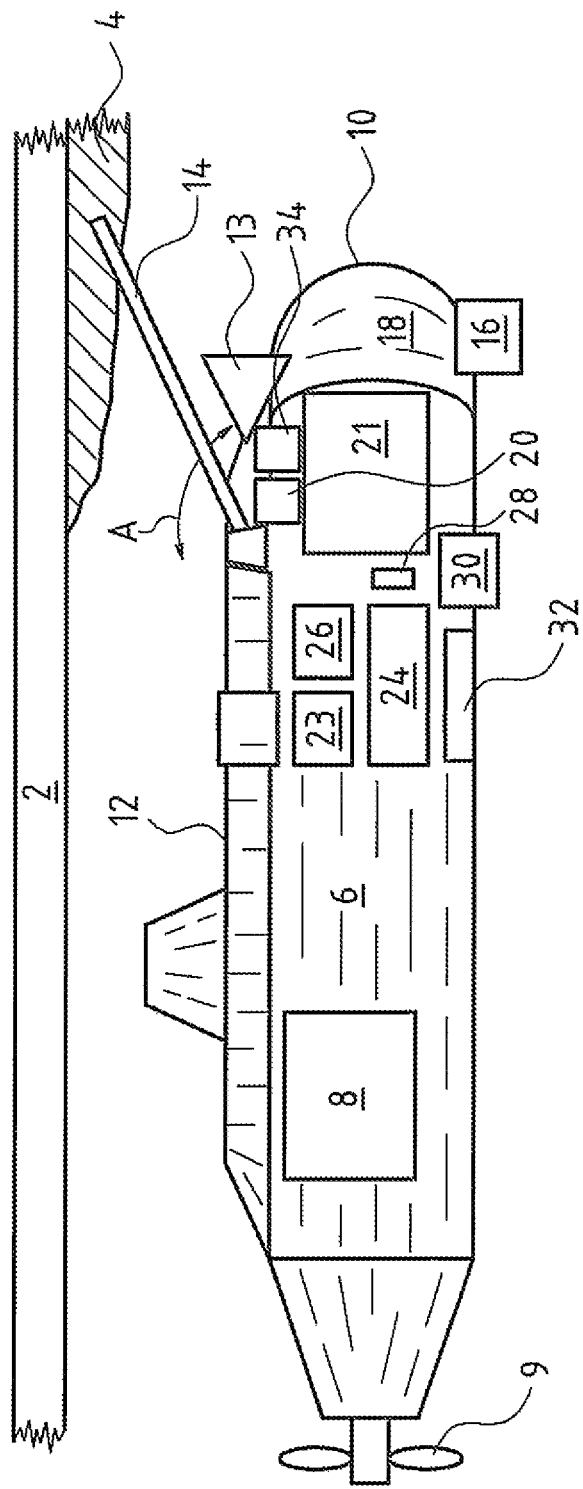
FIG. 2 is a schematic greatly simplified view showing a submarine designed for combating oil, in a second embodiment, on deployment.
Figure 3:
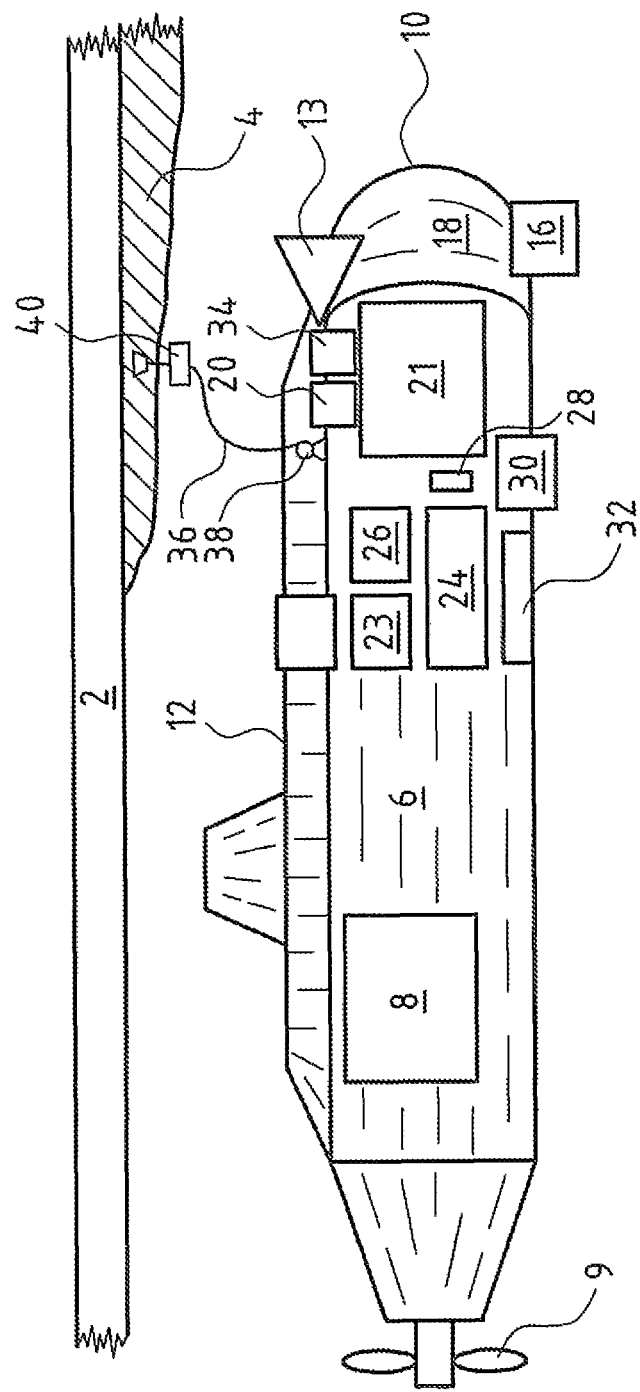
FIG. 3 is a schematic greatly simplified view showing a submarine designed for combating oil, in a third embodiment, on deployment.
Figure 4:
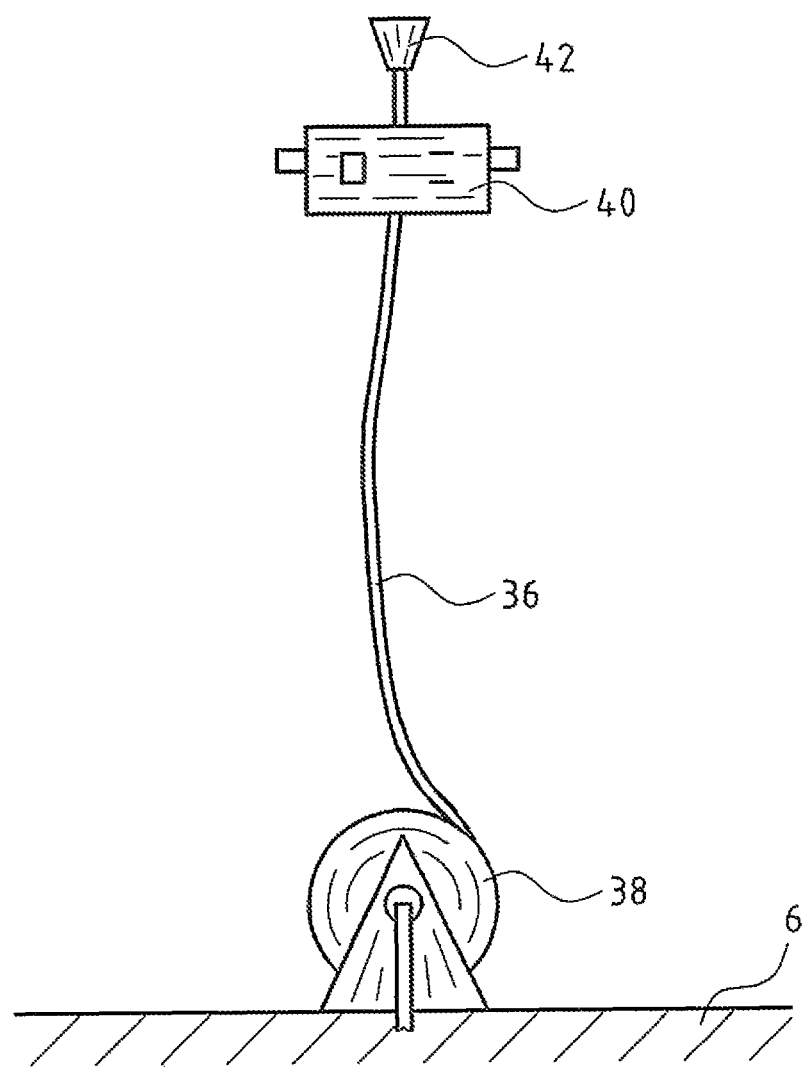
FIG. 4 is a schematic greatly simplified view showing a snout of an oil suction device of the submarine according to FIG. 3.
Figure 5:
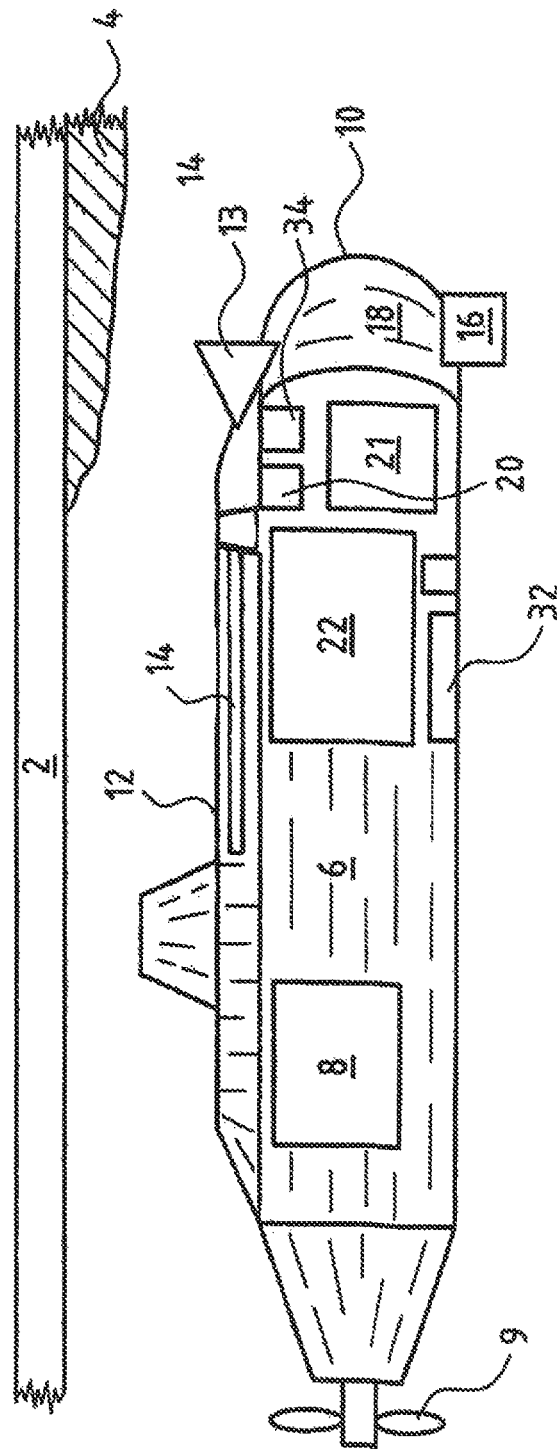
FIG. 5 is a schematic greatly simplified view showing the submarine designed for combating oil, in the first embodiment with the snout pivoted through an opening which is formed on the upper deck.

Referring to the drawings in particular, FIGS. 1 to 3 in each case represent a submarine submerged below an ice sheet 2. Oil which has spilled during oil production has collected into an oil bubble 4 directly below the lower side of the ice sheet 2.

The submarines according to FIGS. 1 to 3 in each case comprise a pressure hull 6. These submarines in each case are driven by an electric drive 8 which is independent of external air, is arranged in the pressure hull 6 and drives a propeller 9. The pressure hulls 6 of the shown submarines are surrounded by an outer hull 10 on the bow side and on the upper side. A section of the outer hull 10 which is arranged on the upper side of the pressure hull 6 in a manner distanced to the pressure hull 6 forms an upper deck 12 of the submarines. Moreover, the three represented submarines in each case comprise an oil suction device. The submarines are moreover each equipped with an oil locating device 13 which is formed by a sonar device arranged on the bow side in the region of the upper deck 12, for locating an oil bubble 4 located below an ice sheet 2.

With the embodiment examples shown in FIGS. 1 and 2, the oil suction device comprises a snout 14 which is formed by a straight, rigid tube. The snout 14 is pivotably mounted on the outer side of the pressure hull 6 and can be pivoted through an opening which is formed on the upper deck 12 but which is not shown, from a storage position 50, between the pressure hull 6 and the upper deck 12 in the pivot direction A (FIG. 1) into an operating position outside the submarine, said operating position being shown in the FIGS. 1 and 2.

For sucking oil out of the oil bubble 4 located below the ice sheet 2, the submarines represented in the FIGS. 1 and 2 are positioned such that the end of the snout 14 which points away in front of the submarine in the operation position of the snout 14, projects into the oil bubble 4. The submarines themselves hereby are distanced to the ice sheet 2 by an adequate amount. In this position, the submarines are dynamically held by an auxiliary drive in the form of an inline thruster 16. The inline thruster 16 is arranged on the bow side of the submarine in an intermediate space 18 between the pressure hull 6 and the outer hull 10 and is pivotable from a storage position within the intermediate space 18, into an operational position outside the submarine.

On the part of the submarine, the snout 14 is connected to an oil suction pump 20. Within the pressure hull 6, the seawater/oil mixture which is delivered by the oil suction pump 20 via the snout 14 out of the oil bubble 4 is led to an oil/water separating device 21. The seawater separated from the oil there is led away out of the submarine via a lock which is not represented in FIG. 1.

The remaining oil, with regard to the submarine represented in FIG. 1, is pumped from the oil/water separating device 21 into an oil tank 22 by way of a delivery pump which is not shown. As soon as the oil tank 22 is completely filled, the submarine seeks out a harbour or a surface vessel, where the oil located in the oil tank 22 is transferred. The submarine subsequently travels back to its deployment location.

With the submarines represented in FIGS. 2 and 3, the oil separated in the oil/water separating device 21 is stored in an intermediate storage device 23. The oil is led to a filling device with a delivery pump which is not represented in the drawing and which is arranged at the exit side of the intermediate storage device 23. The filling device comprises a transport device 24 which automatically receives flexible oil tanks in a storage space 26, which are able to be brought out of the submarine, and positions them in front of a filling nozzle 28 of the filling device in a lock 30 which runs out at the keel of the submarine. The flexible oil tank is then connected to the filling nozzle 28 and thus to the filling device. The flexible oil tank which is fastened on the filling nozzle 28 is brought via the lock 30 into the outer environment of the submarine and there is filled with the oil out of the intermediate storage device 23. After the end of the filling procedure, the filling nozzle 28 is decoupled from the oil tank and the oil tank floats in the direction of the surface of the water where it is received by another submarine and brought to a harbor or to a surface support vessel.

Moreover, the submarines represented in the FIGS. 1 and 2 each comprise a storage tank 32 for chemical oil decomposition means. These oil decomposition means can be brought via the snout 14 into the oil bubble 4 by way of a pump 34 which is connected upstream of the snout 14.

The submarine represented in FIG. 3 differs from the submarine represented in FIG. 2 only with respect to the design of the snout for sucking oil out of the oil bubble 4. The submarine according to FIG. 2 comprises a snout 36 which is formed by a hose, thus is designed in a flexible manner. The snout 36 in a storage position is rolled up on a hose drum 38 located in the intermediate space between the pressure hull 6 and the upper deck 12. The snout 36 is rolled off from the hose drum 38, in order to bring the snout 36 into its operating position. The snout 36 in an end section of the snout 36 which is away from the hose drum 38 is fastened on an ROV 40. The snout 36 is moved in the direction of the oil bubble 4 in a remotely guided manner by the ROV 40 such that a suction cup 42 arranged at the free end of the snout 36 projects into the oil bubble 4. The sucking of the oil and the filling of the flexible oil tanks are subsequently effected as was described with regard to the submarine according to FIG. 1.

While specific embodiments of the invention have been shown and described in detail to illustrate the application of the principles of the invention, it will be understood that the invention may be embodied otherwise without departing from such principles.

The invention claimed is:

1. A submarine comprising:
   a snout which is conduit-connected to a conduit leading into the submarine and a pump, the snout, the pump and the conduit forming an oil suction device sucking away oil into the submarine;
   a pressure hull defining an interior space;
   an outer hull forming an upper deck of the submarine; and
   an oil tank for receiving sucked away oil, the oil tank being in the interior space for submerged travel with the submarine,
   wherein the snout is designed in a rigid manner and is pivotable from a position between the pressure hull of the submarine and the outer hull forming the upper deck of the submarine, into a position outside the outer hull.

2. A submarine according to claim 1, further comprising an oil locating device.

3. A submarine according to claim 1, further comprising an oil/water separating device.

4. A submarine according to claim 1, further comprising a decomposition substance stored on the submarine and a device supplying oil decomposition substance comprising the pump, wherein the snout is connectable to the pump, wherein the snout is connectable to the pump for directing the decomposition substance toward oil for combating oil when submerged.

5. A submarine comprising:
   a hull comprising a pressure hull defining an interior space and an outer hull forming an upper deck;
   a plurality of oil tanks connected to the hull and supported by the hull for submerged travel therewith;
   a filling device comprising a pump connected to the hull and supported by the hull for submerged travel therewith and a filling nozzle;
   a fluid conduit and snout, the fluid conduit extending into the hull and fluidically connecting the snout to at least one of the oil tanks via the filling nozzle, the fluid conduit being supported by the hull for submerged travel therewith and the snout being supported by the hull for submerged travel therewith, the pump being operatively connected to the fluid conduit for pumping oil; and a lock for bringing the oil tanks out of the submarine and into an outer environment of the submarine.

6. A submarine according to claim 5, wherein the snout comprises a rigid snout part that is mounted to pivot from a position between the pressure hull and the upper deck into a position outside the outer hull.

7. A submarine according to claim 5, further comprising a remotely operated vehicle, wherein the snout includes a flexible conduit part fastened to the ROV.

8. A submarine according to claim 5, further comprising an oil locating device connected to the hull.

9. A submarine according to claim 5 further comprising an oil/water separating device.

10. A submarine comprising:
a hull comprising a pressure hull defining an interior space and an outer hull forming an upper deck;
an oil suction pump within the pressure hull and connected to the hull and supported by the hull for submerged travel therewith;
an oil storage device connected to the hull and supported by the hull for submerged travel therewith;
a fluid conduit and snout, the fluid conduit extending into the pressure hull and fluidically connecting the snout to the oil storage device, the fluid conduit being supported by the hull for submerged travel therewith and the snout being supported by the hull for submerged travel therewith, the snout, fluid conduit and the pump forming parts of at least one oil suction device;
a plurality of oil tanks within an interior of the pressure hull and supported by the hull for submerged travel therewith;
a filling device comprising a filling nozzle connected to the oil storage device, the filling nozzle being connectable to at least one of the oil tanks to fill the at least one of the oil tanks with oil from the oil storage device; and
a lock for bringing the oil tanks out of the submarine and into an outer environment of the submarine.

11. A submarine according to claim 10, wherein the oil storage device comprises an oil water separating device within the pressure hull and connected to the hull and supported by the hull for submerged travel therewith and an intermediate storage device within the pressure hull and connected to the hull and supported by the hull for submerged travel therewith.

12. A submarine according to claim 10, wherein the snout comprises a rigid snout part that is mounted to pivot from a position between the pressure hull and the upper deck into a position outside the outer hull.

* * * * *